UNITED STATES PATENT OFFICE.

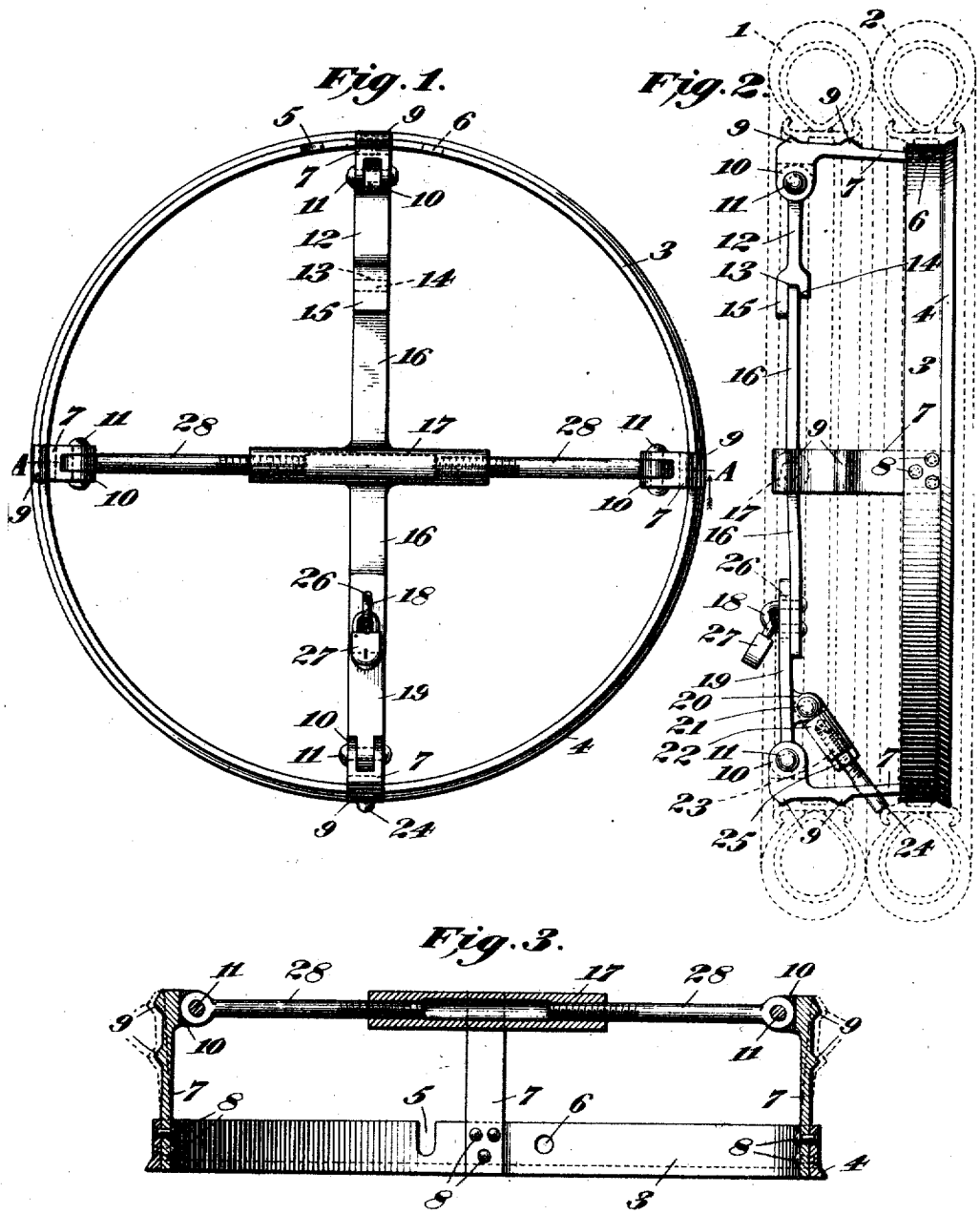

LINDSAY C. PRITNER AND LEWIS S. PAUL, OF JOHNSTOWN, PENNSYLVANIA.

TIRE-HOLDER.

1,329,475.

Specification of Letters Patent.   Patented Feb. 3, 1920.

Application filed August 2, 1919. Serial No. 314,914.

*To all whom it may concern:*

Be it known that we, LINDSAY C. PRITNER and LEWIS S. PAUL, citizens of the United States, and residents of the city of Johnstown, in the county of Cambria and State of Pennsylvania, (whose post-office addresses are Johnstown, Pennsylvania,) have invented certain new and useful Improvements in Tire-Holders; and we do hereby declare the following to be a full, clear, and exact description of the invention, such as will enable others skilled in the art to which it appertains to make and use the same.

Our invention relates to a tire holder adapted to receive and hold one or more pneumatic tires, preferably mounted on their rims, and ordinarily secured to the rear end or elsewhere of pneumatic-tired vehicles.

Our invention consists generally of a tire holder comprising a comparatively thin elastic annulus which may be normally of slightly conical outline or tapered to allow the rim to be slipped on and off and with an outwardly projecting flange at the rear portion to form an abutment to prevent the rim from slipping over the same. Secured to said elastic annulus are a number of flat arms or bars, preferably of metal, with lugs on their outer faces, between which lugs tire rims are adapted to be seated and retained in position thereby. These bars are preferably disposed at angles of 90 degrees around the annulus so that two of the same are opposite each other forming two coöperating pairs. To one pair of opposite bars we pivotally secure threaded rods, which, near the center of the ring, are provided respectively with right and left threads which fit within corresponding internal threads in a cruciform center-piece. The cruciform center-piece is adapted to be rotated on said threaded bars so as to project them outwardly, causing the ring to expand and the flat bars with their projections also to expand, and a reverse movement of the threaded cruciform center-piece will draw the bars inwardly and also bend or spring the annulus or ring inwardly. To the other pair of flat bars we pivotally secure other members one of which has a plain end and the other is in the form of a U-shape member, the outer leg of the U being longer than the other, and these are of such length that when the contacting end of the cruciform member is pressed inwardly and engages within the end of the U-shape piece, it forces or expands the flat bars outwardly and also the ring or annulus so as to enlarge their diameters. In this manner one pair of projections can be drawn inwardly by the screw-threads and the other pair is also drawn inwardly by releasing the toggle joint bars, whereupon a tire rim is slipped over the lug and the cruciform piece may be turned around, thus forcing one pair of the flat bars outwardly, and when this pair is in expanded position the end of the other member of the cruciform center-piece is inserted within the U-shape portion of the link member and forces the other pair of flat bars outwardly, thereby securing the rim in position on the holder. We also provide a staple and lock for securing the same to prevent theft.

Having thus given a general description of our invention, we will now, in order to make the matter more clear, refer to the annexed sheet of drawings forming part of this specification and in which like characters refer to like parts.

Figure 1 is a side elevation of our improved tire holder; Fig. 2 is an end elevation of the same; and Fig. 3 is a horizontal transverse sectional elevation taken on the line A—A of Fig. 1.

Referring now to the characters of reference on the drawings:—1 represents the outer pneumatic tire and rim mounted on our holder. 2 is the inner pneumatic tire and rim also mounted on the inner portion of our holder. 3 is the flat annulus or ring which is provided with upturned or beveled inner flanged edge 4, 5 is a notch in the ring to receive the threaded stem of the tire. 6 is a hole in the annular ring 3 to receive a boss of the wheel rim, some of which rims are made with such bosses in order to prevent their rotation on the felly. 7 are arms or extension brackets secured to the ring 3 by means of the rivets 8 which are countersunk on the outside and flush with the outer surface of the ring, as illustrated. 9 are lugs on the extension brackets adapted to abut against the lower bearing surfaces of the tire rims and approximately fit the same. The extension brackets are each provided with a bifurcated head 10 with hinge pins or rivets 11 passing therethrough, whereby the links 28, the catch-lever 12 and the member 19 are pivoted to said extension brackets. 12 is the link or catch-lever provided with a recess 13 therein formed by the bifurcated ends 14 and 15, the outer one 15 being longer than the inner one 14 so as to form a substantial stop and bearing when the link 12 is in its closed position, as illustrated in Figs. 1 and 2.

The central or cruciform member is comprised of arms 16 and the right and left sleeve-nut portion 17, which is provided with internal screw-threads, one at one side being right-handed and the other at the other side left-handed to correspond with the threads on the links 28. A staple 18 is provided on the lower arm 16 while the locking-arm or lever 19 is provided with a corresponding slot 26 to fit over said staple, and these parts are secured together by the padlock 27. The locking-arm 19 is provided with ears 20 projecting rearwardly from the same, having a pivot pin 21 on which is pivotally mounted the clamping arm 22, which is provided with an internal screw-thread 23 in which is screwed an adjustable extension 24 of the clamping arm and which is locked in place by the lock-nut 25. This clamping arm is adjusted in length by means of the screw-threaded extension 24, the end of which is adapted to contact with the side of the inner rim in order to hold it in place in case only one tire is on the holder, as in case two tires are on the holder the outer one will hold the inner one from displacement.

In order to place a tire in position the padlock 27 is removed, the upper arm 16 of the cross-shape center-piece is grasped by the hand and pulled outwardly, and the cross-shape piece is turned a few revolutions which draws the links 28 inwardly and also springs the ring 3 and extensions 9 inwardly. The disengagement of the upper link 16 from the catch-lever 12 also allows the upper and lower extensions 7 and portions of the ring 3 and attachments to spring inwardly, thereby reducing the diameter of the parts which engage the rim in such a way that the rim and tire can be readily removed. A reverse operation will replace them.

We wish it understood that normally the conformation of the ring 3 and its attachments 7 are such that a tire can be readily slipped on or off the holder when the arms 16 are disengaged and when the links 28 are retracted.

Although we have shown and described our invention in considerable detail, we do not wish to be limited to the exact details of construction specified, but we may use such substitutions, modifications or equivalents thereof as are embraced within the scope of our invention as pointed out in the claims.

Having thus described our invention, what we claim and desire to secure by Letters Patent is:—

1. A tire holder comprising an annular rim, extension brackets formed rigid therewith, two pairs of extensions pivoted to said brackets, and a cross-shaped center piece having threaded connection with one pair of extensions, and being interlocked with the other pair of extensions.

2. A tire holder comprising an annular rim, extension brackets formed rigid therewith, two pairs of extensions pivoted to said brackets, and a cross-shaped center piece having threaded connection with one pair of extensions and being interlocked with the other pair of extensions, and means for holding the extensions and center piece relatively immovable.

3. A tire holder comprising an annular rim provided with a flange extending outwardly from the rear portion thereof; two pairs of extension brackets, the ends of which are secured within said ring, the other ends being provided with pivots, with right and left-threaded links pivotally secured to one pair of said extension brackets, links pivoted to the other pair of extension brackets, and a cross-shaped centerpiece, the threaded links operating in a right and left-threaded nut forming part of the cross-shape center portion with the center piece operatively engaging the second pair of links.

4. A tire holder comprising an annular rim having an outwardly extending flange on the rear portion thereof; two pairs of extension brackets secured thereto and extending outwardly therefrom in the general direction of the axis; a pair of links each pivoted to one of one opposing pair of said links, which links are provided with right and left screw-threads respectively; a cruciform connecting member provided with internal right and left screw-threads coöperating with the links aforesaid, the other pair of extension brackets having swinging links pivoted thereto adapted to form a toggle joint with other portions of said central cruciform member.

5. A tire holder comprising a flat annulus; two pairs of extension brackets secured within and projecting outwardly therefrom in an axial direction, said brackets being provided with lugs on their external faces adapted to receive tire rims; a pair of links with right and left-threaded ends pivoted to one opposing pair of extension brackets; a central cruciform member provided with internal right and left screw-threads and adapted to coöperate with the links aforesaid; another pair of links pivoted to the other opposing pair of extension brackets and adapted to form a toggle joint with members projecting outwardly from said cruciform member.

6. A tire holder comprising an annulus, a plurality of extension brackets projecting outwardly from the annulus, projections formed on the outer faces of said brackets to support tire rims, two pairs of links pivoted to said brackets, the adjacent ends of one pair of links having right and left hand threads, and a central cruciform-shaped piece having connection with said threaded ends of one pair of links and adapted to expand and contract the other pair of links.

In witness whereof we hereunto affix our signatures.

LINDSAY C. PRITNER.
LEWIS S. PAUL.